(12) United States Patent
Kinion

(10) Patent No.: US 12,501,889 B1
(45) Date of Patent: Dec. 23, 2025

(54) ATTACHABLE RESCUE FLOTATION DEVICE

(71) Applicant: Thomas Kinion, Kennewick, WA (US)

(72) Inventor: Thomas Kinion, Kennewick, WA (US)

( * ) Notice: Subject to any disclaimer, the term of this patent is extended or adjusted under 35 U.S.C. 154(b) by 0 days.

(21) Appl. No.: 18/675,061

(22) Filed: May 27, 2024

(51) Int. Cl.
*A01K 87/00* (2006.01)
*B63C 7/10* (2006.01)

(52) U.S. Cl.
CPC .............. *A01K 87/008* (2022.02); *B63C 7/10* (2013.01)

(58) Field of Classification Search
CPC .......... A01K 87/008; B63B 22/22; B63C 7/10
See application file for complete search history.

(56) References Cited

U.S. PATENT DOCUMENTS

| | | | | |
|---|---|---|---|---|
| 2,531,586 A * | 11/1950 | Ramsey | ................. | A01K 97/24 441/8 |
| 3,071,787 A * | 1/1963 | Burker | .................. | A01K 93/00 222/5 |
| 3,210,785 A * | 10/1965 | Ward | ..................... | A01K 97/24 441/9 |
| 4,578,041 A * | 3/1986 | Heitkamp, III | ........ | A01K 97/00 441/95 |
| 4,687,451 A * | 8/1987 | Chen | ......................... | B63C 9/24 441/95 |
| 5,592,773 A | 1/1997 | Perry | | |
| 6,036,559 A * | 3/2000 | Arnold | .................... | A01K 87/00 441/6 |
| 6,755,708 B1 * | 6/2004 | McLarty | .................. | B63C 7/10 441/95 |
| 9,803,951 B1 * | 10/2017 | Mashburn | ................. | F41B 5/14 |
| 10,343,751 B2 | 7/2019 | Hollen et al. | | |
| 10,974,800 B1 * | 4/2021 | Duthie | ..................... | B63C 9/155 |
| 11,910,790 B1 * | 2/2024 | Sohan | ..................... | A01K 93/02 |
| 2011/0078938 A1* | 4/2011 | Aguzin | ................ | A01K 87/007 43/25 |

* cited by examiner

*Primary Examiner* — Richard G Davis
(74) *Attorney, Agent, or Firm* — Sanchelima & Associates, P.A.; Jesus Sanchelima; Christian Sanchelima

(57) ABSTRACT

An attachable rescue floating device including a water sport apparatus, a floatation assembly, and an attaching assembly. The floatation assembly is connected to the attaching assembly to secure the floatation assembly to the water sport apparatus. Different embodiments of the attachment assembly include hook and loop fasteners, straps, magnets, or tie downs. The floatation assembly includes a gas cartridge which automatically inflates a balloon when water is detected to prevent the water sport apparatus from sinking. The floatation assembly includes a housing to wrap the balloon and the gas cartridge forming a rectangular shape to be attached to the water sports apparatus.

1 Claim, 3 Drawing Sheets

ATTACHABLE RESCUE FLOTATION DEVICE

BACKGROUND OF THE INVENTION

The present invention relates to attachable rescue flotation devices and, more particularly, to an attachable rescue floating device that can rescue an item from sinking in the water.

DESCRIPTION OF THE RELATED ART

Several designs for floating devices have been designed in the past. None of them, however, include an attachable rescue floating device capable of being attached to different items to prevent them from sinking in water.

Applicant believes that a related reference corresponds to U.S. Pat. No. 10,343,751 issued for a water rescue device for personal items. Applicant believes that another related reference corresponds to U.S. Pat. No. 5,592,773 issued for a fishing rod floatation device. None of these references, however, teach of an attachable rescue floating device that automatically inflates a balloon when the device is in contact with water. The device can be attached via different attaching methods.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an attachable rescue floating device that prevents sport items such as fishing rods from sinking in the water.

It is another object of this invention to provide an attachable rescue floating device that automatically inflates a balloon when the device is in contact with water.

It is still another object of the present invention to provide an attachable rescue floating device that can be attached to different items such as cameras or phones to prevent them from sinking in the water.

It is yet another object of this invention to provide an attachable rescue floating device that can be attached to an item using a variety of attachment means such as straps, magnets or tie downs.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
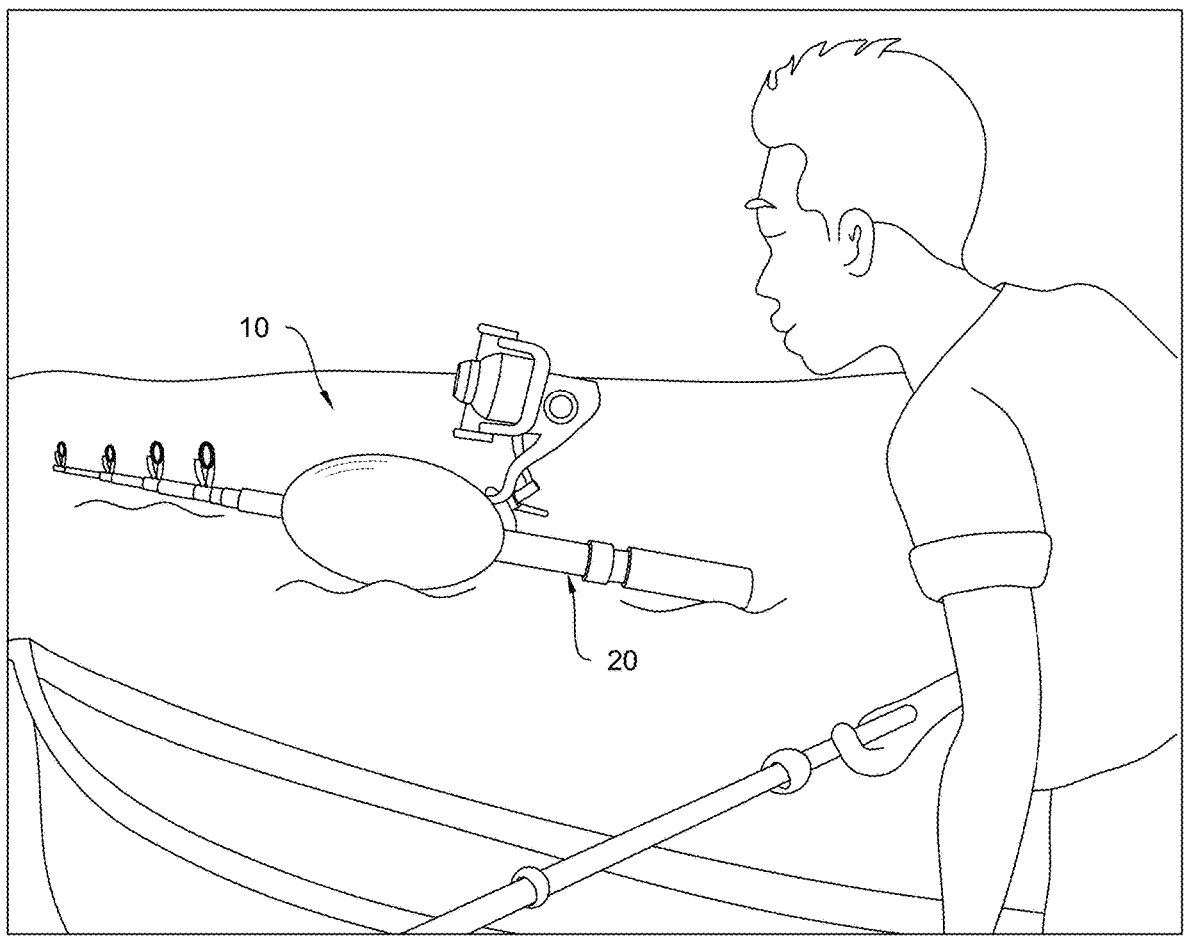
FIG. 1 represents an operational view of the present invention 10 mounted into a water sports apparatus 20.
Figure 2:
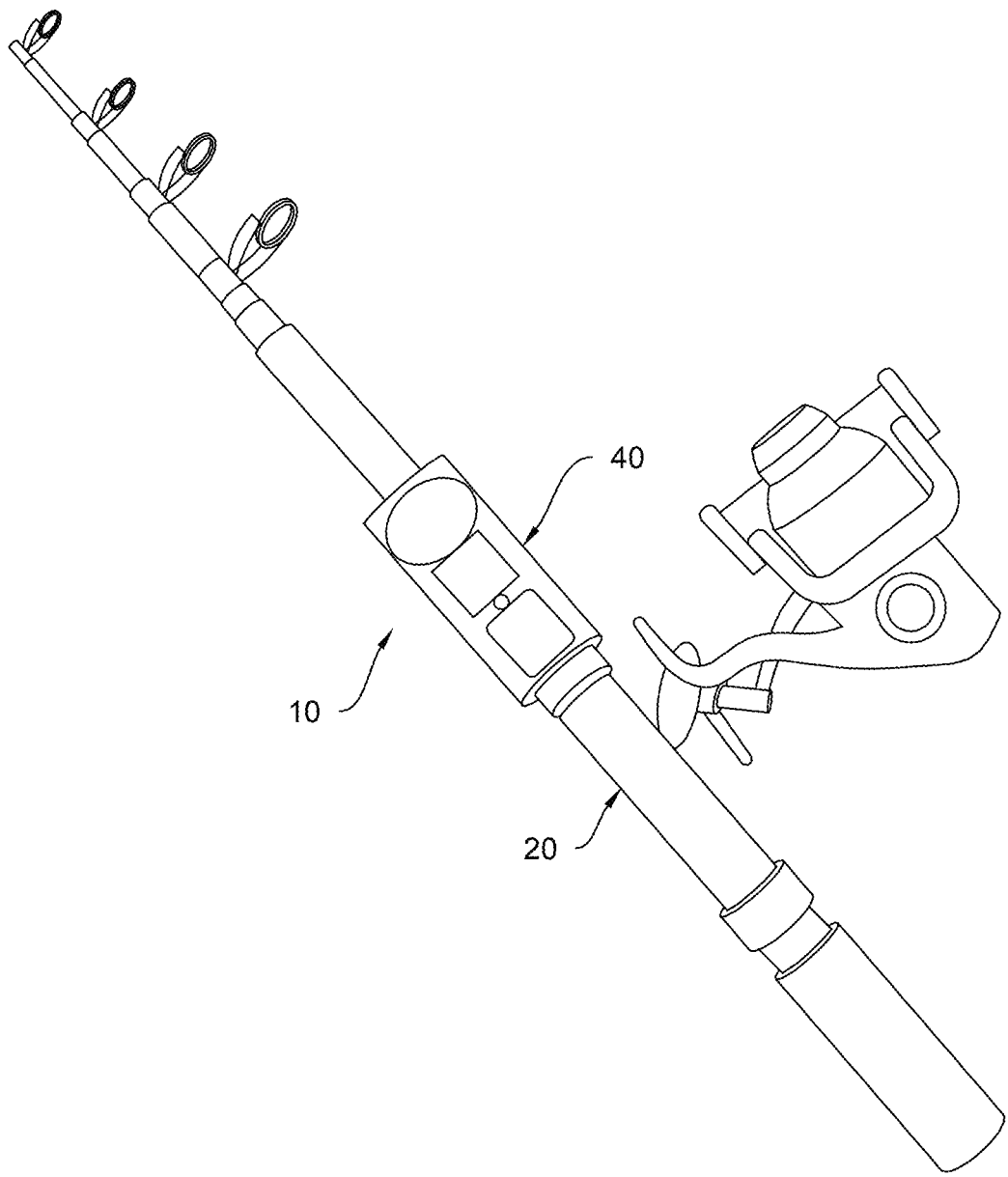
FIG. 2 shows an isometric view of the present invention 10. The floatation assembly 40 is attached to the water sports apparatus 20.
Figure 3:
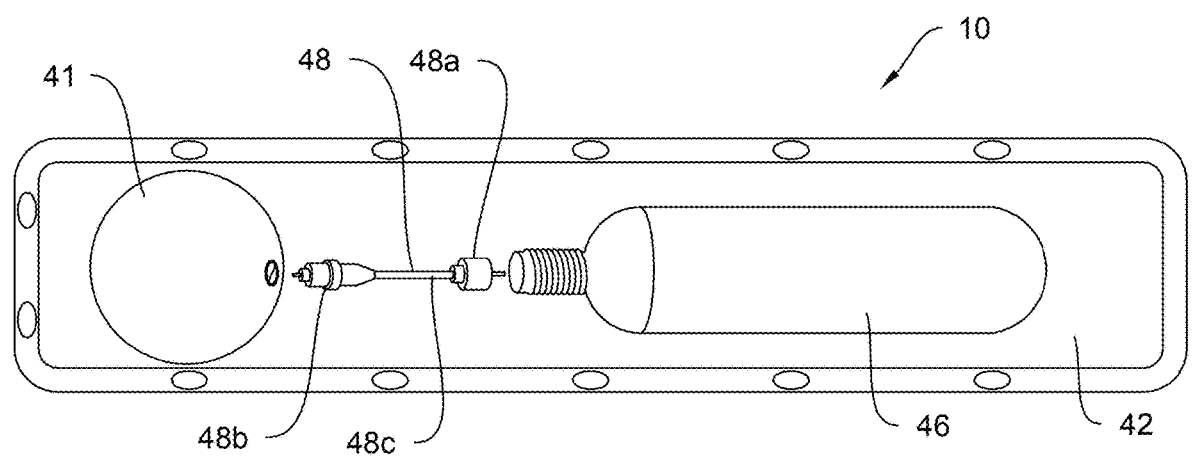
FIG. 3 illustrates a rear view of the present invention 10 depicting the elements of the floatation assembly 40 including the inflator 48 disconnected from the inflatable member 41 and from the cartridge 46.

Referring now to the drawings, where the present invention is generally referred to with numeral 10, it can be observed that it basically includes a water sports apparatus 20, a floatation assembly 40, and an attaching assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

In one embodiment, the water sports apparatus 20 may include a fishing rod 22 with a handle 24, guides, and a rod. Fishing rods are well known to one skilled in the art. Therefore, the fishing rod 22 has not been described in detail and the specifics herein disclosed are not to be interpreted as limiting, but rather as a basis and/or principle for the claims, and/or as representative basis for teaching one skilled in the art to employ this invention in virtually appropriately detailed system, structure, or matter. In other embodiments, the water sports apparatus 20 may be any water sports device or apparatus such as but not limited to cameras, smartphones, or any other valuable object for kayakers, fishmen, or surfers.

The floatation assembly 40 may include an inflatable member 41. In a preferred embodiment, the inflatable member 41 may be an inflatable balloon. It also may be suitable to have any other inflatable device capable of being attached to the water sports apparatus 20. The inflatable member 41 may be made of a durable waterproof plastic, foam, or any other suitable polymer. The inflatable member 41 may be compactly folded when deflated allowing the floatation assembly 40 to be unobtrusively attached to the water sports apparatus 20.

The floatation assembly 40 may further include a cartridge 46 being connected to the inflatable member 41 using an inflator 48. The inflator 48 may have an inlet nozzle 48a to connect and seal with an outlet of the cartridge 46. The inflator 48 may have an outlet nozzle 48b to connect and seal with an opening of the inflatable member 41. The inlet nozzle 48a and outlet nozzle 48b of the inflator 48 may be in gas communication through a tube 48c allowing a gas provided by the cartridge 46 to circulate therethrough. The cartridge 46 may contain a gas at high pressure. The gas may be an inert gas such as but not limited to carbon dioxide, nitrogen, or any other suitable gas that may rapidly inflate the inflatable member 42 when needed.

The cartridge 46 may have a substantially cylindrical shape with a bottle neck. The cartridge 46 may allow the inflatable member 41 to switch from a compact folded form to a buoyant inflated balloon configuration allowing the water sports apparatus 20 to float. The cartridge 46, the inflator 48 and the inflatable member 41 may be attached to a housing 42. The housing 42 may be made of a plastic or any other suitable waterproof material. The housing 42 may have a yellow color or any other color to facilitate visual detection of the devise. It also may be suitable to have the housing 42 with lights, reflective portions, or the like for an easier visibility. The housing 42 may wrap the cartridge 46, the inflator 48, and the inflatable member 41 for mounting the floatation assembly 40 to a water sports apparatus 20. The housing 42 may have holes 44 around a perimeter thereof. The holes 44 may allow attaching the floatation assembly 40 to different types of water sports apparatus 20.

In one embodiment, the attaching assembly 60 may include hook fasteners 62 and loop fasteners 64. The hook fasteners 62 may cooperate with the loop fasteners 64 to removably secure the floatation assembly 40 to the water sports apparatus 20. Other embodiments of the attaching assembly 60 may include magnets, straps, elastic cords, bungee cords, carabiners, buckles, tie downs, or any other suitable fastener that allows securing the floatation assembly 40 to the water sports apparatus 20. The hook fasteners 62 may be secured to the holes 44 located on a top portion of the housing 42 using stitching, bolts or any other suitable fasteners. The loop fasteners 64 may be secured to the holes 44 located on a bottom portion of the housing 42 using stitching or any other suitable fasteners.

Figure 4:
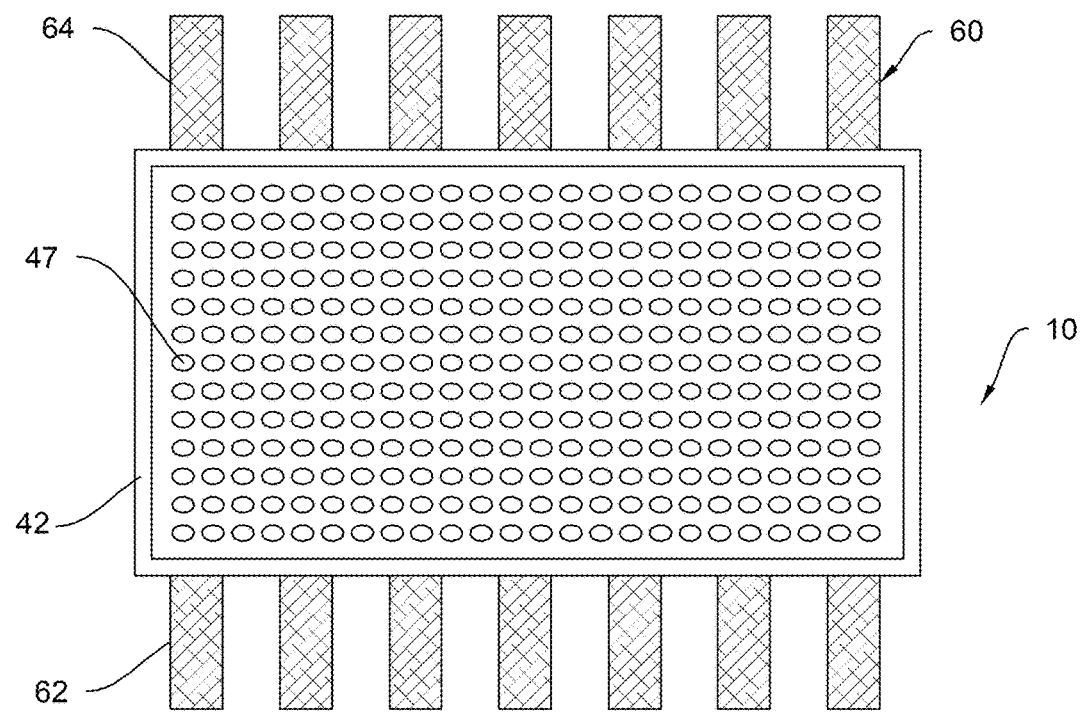
FIG. 4 is a representation of a front view of the present invention 10 showing the attaching assembly 60 and the mounting holes 47.

Best observed in FIG. 4, the floatation assembly 40 may further include mounting holes 47. In one of the preferred embodiments, the mounting holes 47 may be disposed along an entire surface of the housing 42. The mounting holes 47 may allow the housing to be mounted into different shapes and devices. The mounting holes may allow a customizable mounting onto the water sports apparatus 20.

In one of the preferred embodiments of the present invention 10, the floatation assembly 40 may be attached to a fishing rod 42. The floatation assembly 40 may be located next to the reel seat of the fishing rod 42. It also may be suitable to locate the floatation assembly in the handle of the fishing rod 42 or in another suitable location that does not obstruct the conventional use of the fishing rod 42 when fishing. The housing 42 may wrap the inflatable member 41, the cartridge 46, and the inflator 48 into a compact rectangular shape or any other suitable shape to fit and align with the fishing rod 22. The housing 42 may also be folded and wrap the inflation assembly 40 forming other shapes and sizes according to the size and shape of the item floatation assembly 40 will be attached to. The attaching assembly 60 may secure the floating assembly 40 to the fishing rod 22. The cartridge 46 may be an automatic gas cartridge 46. Automatic gas cartridges are well known in the prior art and exemplary uses may include automatic life jackets. Automatic gas cartridges may include a salt tablet configured to release a spring when the salt tablet is in contact with water. The spring may be configured to activate a needle to punctuate the cartridge for to release the gas contained therein inflating the balloon 41 to allow the fishing rod 42 or other items to float and be rescued from the water. It should be understood that the cartridge 46 may be any other suitable automatic cartridge known in the art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An attachable rescue floating device comprising:
    a) a water sports apparatus including a fishing rod;
    b) a floatation assembly including a balloon, an inflator and a gas cartridge, wherein the gas cartridge contains carbon dioxide gas, said gas cartridge is an automatic gas cartridge, said gas cartridge is connected to the balloon through the inflator, said floatation assembly further including a housing that wraps the balloon and cartridge in a rectangular form to be attached to the water sports apparatus, said housing has a plurality of holes in a perimeter thereof, said housing further including mounting holes distributed along an entire surface, said mounting holes configured to allow customizable mountings; and
    c) an attaching assembly connected to the fishing rod, the attaching assembly includes hook and loop fasteners to attach the floatation assembly to the water sports apparatus, said hook and loop fasteners are disposed in the holes of said housing.

* * * * *